Patented Oct. 8, 1940

2,217,630

UNITED STATES PATENT OFFICE 2,217,630

METHOD OF PREPARING SECONDARY AMINES

Charles F. Winans, Fairlawn, Ohio, assignor to Wingfoot Corporation, Wilmington, Del., a corporation of Delaware No Drawing. Application January 19, 1938, Serial No. 185,701

9 Claims. (Cl. 260—345)

This invention relates to a new and improved method of preparing secondary amines from aldehyde and ammonia. More particularly, it relates to a process of hydrogenating an aldehyde and ammonia in which the aldehyde is in excess with respect to the ammonia to promote the formation of the secondary amine and to suppress the formation of the primary amine.

Heretofore, it has been observed that, where certain aldehydes, such as benzaldehyde, are reacted with ammonia to produce the hydroamide and the latter is then hydrogenated, the result is the formation of substantially equal molecular quantities of primary amine and secondary amine. Depending upon the product desired, this result is not entirely satisfactory since production of one of these amines may be the objective of the procedure and the other is merely an undesired by-product. By the practice of the present invention, the reaction may be so conducted that a predominant amount of the secondary amine is the result of the hydrogenation.

The method, in its general outlines, comprises mixing the aldehyde with a deficiency of ammonia under superatmospheric conditions of temperature and pressure and in the presence of a hydrogenation catalyst. The temperature may vary from 50°–200° C. but generally there is no advantage in employing a temperature higher than 150°–160° C., a temperature below 100° C. having been found to give good results. The pressure may also be varied within wide limits, the range being dependent upon the absorption of hydrogen. Hydrogen will be absorbed at pressures as low as 300 pounds per square inch (20 atmospheres) and the pressure may go as high as the strength of the apparatus in which the process is carried out will permit. Usually there will be no object in employing a pressure above 150 atmospheres and the most desirable pressure range is found to be from 25–125 atmospheres.

Any of the more active hydrogenation catalysts may be used to promote the hydrogenation but it has been found that the nickel catalyst prepared by the treatment of a nickel alloy, such as nickel-aluminum, or nickel-silicon, with aqueous alkalies, as described in Raney Patent 1,628,190, is particularly effective. Another nickel catalyst which may be employed with excellent results is the supported nickel catalyst prepared by mixing an aqueous solution of a nickel salt and a foraminous carrier, such as acid-washed kieselguhr, and thereafter grinding the carrier-nickel-salt mixture until it is of a cream-like consistency. Following this, a carbonate precipitant which reacts basic to litmus paper, preferably an aqueous solution of an ammonium or alkali metal carbonate, such as ammonium carbonate, sodium carbonate or sodium bicarbonate, is added to the mixture, maintained during the addition of carbonate at a temperature of 70°–80° C. After washing and drying, the resulting precipitated nickel carbonate is reduced in a stream of hydrogen or other reducing gas for approximately 60–80 minutes at 425–475° C., the finished catalyst containing 15±2% nickel. Other catalysts prepared in a similar manner may also be used, examples being those prepared from copper, or cobalt. Platinum and other noble metal catalysts may also be employed with satisfactory results, but because of the lower cost of the base metal hydrogenation catalysts, the latter will generally be used.

Nickel catalysts prepared by other methods, such as the following, may also be used in the practice of the invention: (1) the reduction of nickel oxides, silicates, carbonates and bicarbonates, either supported or unsupported, by hydrogen or other reducing agent; (2) the reduction of nickel oxides, silicates, carbonates and bicarbonates in admixture with salts of other metals of group VIII of Mendelejeff's Periodic Table, the reduced salts acting as co-catalyst; (3) the reduction of nickel oxides, silicates, carbonates and bicarbonates mixed with promoters such as oxides of the metals of groups II, III, IV, V and VI of Mendelejeff's Periodic Table; (4) anodic oxidation of nickel surfaces followed by reduction; (5) precipitation by more electropositive metals such as aluminum and zinc.

However, the Raney nickel catalyst, as described above, is the preferred catalyst in promoting complete hydrogenation as required by the present process of preparing primary amines.

In explanation of the mechanism of the reaction by which the amount of primary amine produced is increased, in accordance with the principles of the present invention, the following theoretical discussion is given. Aldehydes may be divided into three types having the respective formulae: $RCH_2CHO$, $R_2CHCHO$ and $R_3CCHO$, in which the carbon atom alpha to the aldehyde group is successively substituted by one, two or three radicals, this carbon atom, in the last instance, having all of its hydrogen atoms substituted by other radicals. Of course, this carbon atom can also constitute one member of a cyclic group in which all of its valences have been satisfied without the presence of hydrogen. It is found that the first type of aldehydes forms reaction products with ammonia which hydrogenate to amines with a poor yield due to resinification of the material in an aldol reaction. The second type reacts with ammonia to yield an isolable imine $R_2CH—CH=NH$ which can be separated from the reaction mass and readily hydrogenated to give the primary amine and yield a large quantity of by-products which cut down the amount of desired product. The third type, however, does not yield a stable imine which can be isolated and then hydrogenated to form the primary amine.

Aldehydes of the last-mentioned type, $R_3C—CHO$, such as benzaldehyde, furfuraldehyde, and trimethyl acetaldehyde are commonly thought of as forming hydroamides with ammonia, but these hydroamides are actually somewhat unstable and are altered easily by simple treatment. Thus, the most rational expression for the reaction of one of these aldehydes with ammonia is as follows:

I. $\quad RCHO+NH_3 \rightleftarrows RCH=NH+H_2O$

II. $\quad 3\ RCH=NH \rightleftarrows (RCH=)_3N_2+NH_3$

III. $\quad 3\ RCHO+2\ NH_3 \rightleftarrows (RCH=)_3N_2+3H_2O$

The third equation is the sum of the other two and is the usual equation for the formation of hydroamides by the reaction of an aldehyde and ammonia. If the product of this equation, the hydroamide $(RCH=)_3N_2$, is hydrogenated, the product consists of the primary amine and the secondary amine in equal molecular proportions as follows:

IV. $\quad (RCH=)_3N_2+3H_2 \longrightarrow RCH_2NH_2+(RCH_2)_2NH$

In order to direct the hydrogenation toward the production of a predominant amount of secondary amine at the expense of the formation of primary amine, the aldehyde is supplied in excess of 1½ mols of aldehyde to 1 mol of ammonia, or in excess of the ratio required for the formation of the hydroamide as called for in Equation III above, in order to displace the equilibrium in Equation II toward the hydroamide $(RCH=)_3N_2$. This compound, as shown in Equation IV, readily hydrogenates to produce equal molecular quantities of the primary amine and the secondary amine. It is believed that the primary amine thus formed then reacts with the excess of aldehyde present to give an anil in the sense of the equation:

V. $\quad RCH_2NH_2+RCHO \longrightarrow RCH_2N=CHR+H_2O$

Thus, when benzaldehyde is reacted with less than a molecular quantity of ammonia and hydrogenated, the intermediate product produced via the hydroamide is supposed to be benzal-benzyl amine of the formula:

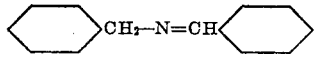

which is readily reduced by further hydrogenation to dibenzyl amine

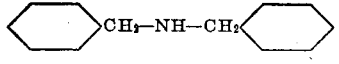

the desired secondary amine.

It is also possible to prepare secondary amines by utilizing the appropriate hydroamide as a starting material and hydrogenating this in the presence of aldehyde. Thus, the reaction may be considered to proceed as follows:

VI. $\quad (RCH=)_3N_2+RCHO+4\ H_2 \longrightarrow 2(RCH_2)_2NH+H_2O$

Accordingly, the improved process herein set forth of making secondary amines also contemplates starting with the hydroamide and hydrogenating the same in the presence of aldehyde.

The method outlined is comparatively simple and expeditious to carry out, yielding a hydrogenated reaction mass from aldehyde ammonia and hydrogen which contains large amounts of secondary amine recoverable directly from such reaction mass without further chemical treatment or reaction. That is to say, the secondary amine exists as such in the reaction mixture and it is necessary only to distill the same to remove the product, no hydrolysis or other intervening chemical step being required.

The method can be used to treat various aldehydes with no hydrogen on the carbon atom alpha to the aldehyde group but, practically speaking, benzaldehyde and its homologues and substitution products are the most important of these, due to their greater availability. Other aldehydes which can be subjected to the process in order to produce secondary amines are furfuraldehyde, ortho meta and para toluic aldehydes, chlor benzaldehyde, mesityl aldehyde, 2-5-dimethyl benzaldehyde, cumic aldehyde, alpha and beta naphthaldehydes, vanillin, salicyl aldehyde, p-hydroxy benzaldehyde, trimethyl acetaldehyde, tri ethoxy acetaldehyde and other aldehydes the alpha carbon atom of which is attached only to other carbon atoms or oxygen atoms.

The aldehyde and ammonia are preferably both dissolved, preparatory to hydrogenation, in an organic solvent, such as alcohol, but the invention is not limited thereto. Also, the ammonia may be added partly in solution and partly in gaseous form, or it may be added entirely in gaseous form in sufficient amount. Thus, the aldehyde and ammonia may be brought together in any manner which facilitates reaction and the mixture then hydrogenated.

Various aldehydes were treated in accordance with the foregoing principles to yield the corresponding secondary amines. In each instance, two mols of the aldehyde were hydrogenated in solution in the presence of one mol of ammonia, a deficiency of ammonia, and the product was principally a secondary amine. In each instance, the reaction was completed in about 60 minutes in alcohol solution, a Raney nickel catalyst being used, the hydrogen pressure varying from 27–125 atmospheres.

TABLE I

*Hydrogenation of aldehydes with ammonia*

| | Name | Amount | Mols | Ammonia Amount | Mols | Products | Yield | Percent |
|---|---|---|---|---|---|---|---|---|
| | | *Grams* | | *Grams* | | | *Grams* | |
| 1 | Benzaldehyde | 318 | 3.0 | 27 | 1.5 | Benzylamine | 54 | 16.8 |
| | | | | | | Dibenzylamine | 239 | 80.8 |
| 2 | o-Methylbenzaldehyde | 200 | 1.67 | 14.3 | 0.84 | o-Methylbenzylamine | 28.6 | 14.2 |
| | | | | | | Di-o-methylbenzylamine | 110 | 58.7 |
| 3 | Furfurylaldehyde | 288 | 3.0 | 26 | 1.5 | Furfurylamine | 37 | 12.2 |
| | | | | | | Difurfurylamine | 182 | 65.5 |

It will be noted that an excess of aldehyde was present in each instance, this excess being defined as more than 3 mols of aldehyde to 2 mols of ammonia as required to form the hydroamide which normally hydrogenates to yield equimolecular quantities of the primary and secondary amines. The effect of the excess of aldehyde is quite marked, the yield of secondary amine being several times that of the primary amine.

To illustrate the applicability of the process to the treatment of hydroamides as starting materials, the following data is included.

TABLE II

*Hydrogenation of aldehydes with ammonia*

| Mixture | Amount | Mols | Products | Yield | Percent |
|---|---|---|---|---|---|
| | Grams | | | Grams | |
| 4 Hydrobenzamide | 110 | 0.37 | Benzylamine | 18.5 | 11.7 |
| Benzaldehyde | 39 | 0.37 | Dibenzylamine | 94 | 67 |

To illustrate the marked effect which the ratio of aldehyde to ammonia has on the product obtained, another table is given comparing the amounts of secondary amine obtained, with respect to primary amine, when various molar ratios of aldehyde to ammonia are employed. The difference in results is quite pronounced, as will be observed.

TABLE III

| Name | Molar ratio | | Weight ratio | | Normal wt. ratio |
|---|---|---|---|---|---|
| | Aldehyde | Ammonia | Pri. amine | Sec. amine | |
| Benzaldehyde | 2 | 1 | 0.226 | 1 | 0.542:1 |
| Do | 1 | 1 | 13.7 | 1 | 0.542:1 |
| o-Toluic aldehyde | 2 | 1 | 0.26 | 1 | 0.538:1 |
| Do | 1 | 1 | 5.75 | 1 | 0.538:1 |
| Furfuraldehyde | 2 | 1 | 0.203 | 1 | 0.548:1 |
| Do | 1 | 1 | 12.9 | 1 | 0.548:1 |

The normal ratio of primary to secondary amine, as given in the last column, is that which prevails when the hydroamide is hydrogenated, the two amines being formed in equimolecular amount, or in the weight ratio indicated. It will be seen that formation of one of the amines and suppression of the other by adjustment of the aldehyde-amine ratio results in a wide departure from the normal in either direction, the amount of secondary amine being, on the average, about five times the amount of primary amine produced, when an excess of aldehyde is present whereas, normally only twice as much secondary amine, by weight, is produced as of primary amine.

This application is a continuation in part of application Serial No. 21,687, filed May 15, 1935, now Patent 2,109,159.

The process herein described is, then, characterized by the hydrogenation of a mixture of an aldehyde and ammonia, with the aldehyde in excess of that required for the initial reaction with ammonia, from which reaction mass the secondary amine can be directly separated, as by distillation or other purely physical separation, in predominant amount. The process is applicable to all of those aldehydes mentioned herein, as well as others of the same class. It will be apparent that the specific details of the process may be widely varied without departing from the inventive concept and such changes will readily suggest themselves to those skilled in the art.

It is intended that the patent shall cover, by suitable expression in the appended claims, all features of patentable novelty residing in the invention.

What I claim is:

1. In a method of preparing secondary amines, the steps which comprise hydrogenating under a pressure greater than 20 atmospheres and at a temperature between about 50° and 200° C. in the presence of a hydrogenation catalyst, an aldehyde from the group consisting of alkyl, alkoxy, aryl, alkyl aryl, hydroxy aryl, alkoxy aryl, halogen aryl, and furfuryl aldehydes, the alpha carbon of which is attached only to one of the group consisting of carbon and oxygen, in the presence of a deficiency of ammonia with respect to that necessary to form the hydro amide of said aldehyde, and separating directly from the reaction mass a predominant proportion of secondary amine.

2. In a method of preparing secondary amines, the steps which comprise hydrogenating under a pressure greater than 20 atmospheres and at a temperature between about 50° and 200° C. in the presence of a hydrogenation catalyst, an aldehyde from the group consisting of alkyl, alkoxy, aryl, alkyl aryl, hydroxy aryl, alkoxy aryl, halogen aryl, and furfuryl aldehydes, the alpha carbon of which is attached only to one of the group consisting of carbon and oxygen, in the presence of less than $2/3$ mol of ammonia to one mol of aldehyde and separating directly from the reaction mass a predominant proportion of secondary amine.

3. In a method of preparing secondary amines, the steps which comprise hydrogenating under a pressure greater than 20 atmospheres and at a temperature between about 50° and 200° C. in the presence of a base metal hydrogenation catalyst, an aldehyde from the group consisting of alkyl, alkoxy, aryl, alkyl aryl, hydroxy aryl, alkoxy aryl, halogen aryl, and furfuryl aldehydes, the alpha carbon of which is attached only to one of the group consisting of carbon and oxygen, in the presence of less than $2/3$ mol of ammonia to one mol of aldehyde and separating directly from the reaction mass a predominant proportion of secondary amine.

4. In a method of preparing secondary amines, the steps which comprise hydrogenating under a pressure greater than 20 atmospheres and at a temperature between about 50° and 200° C. in the presence of a hydrogenation catalyst, the hydro amide corresponding to the secondary amine desired and an aldehyde corresponding to the hydro-amide and selected from the group consisting of alkyl, alkoxy, aryl, alkyl aryl, hydroxy aryl, alkoxy aryl, halogen aryl and furfuryl aldehydes, the alpha carbon atom of which aldehyde is attached only to one of the group consisting of carbon and oxygen and collecting a product containing a predominant proportion of secondary amine.

5. In a method of preparing secondary amines, the steps which comprise hydrogenating under a pressure greater than 20 atmospheres and at a temperature between about 50° and 200° C. in the presence of a hydrogenation catalyst a solution of an aldehyde selected from the group consisting of alkyl, alkoxy, aryl, alkyl aryl, hydroxy aryl, alkoxy aryl, halogen aryl and furfuryl aldehydes, the alpha carbon atom of which is attached only to carbon atoms and less than $2/3$ of a mol of ammonia for each mol of the aldehyde present, dissolved in an inert inorganic solvent in which the aldehyde and ammonia are soluble, and separating directly from the hydrogenated mass a predominant proportion of secondary amine.

6. A process of preparing secondary amines which comprises hydrogenating under a pressure between about 20 and 125 atmospheres and at a temperature between about 50° and 200° C. in the presence of a nickel-containing catalyst, a solution of an aldehyde selected from the group consisting of alkyl, alkoxy, aryl, alkyl aryl, hydroxy aryl, alkoxy aryl, halogen aryl and furfuryl aldehydes, the alpha carbon atom of which is attached only to carbon atoms, and less than $2/3$ mol of ammonia to each mol of aldehyde present and distilling directly from the hydrogenated solution a predominant proportion of secondary amine.

7. A process of preparing secondary amines which comprises hydrogenating under a pressure between about 20 and 125 atmospheres and at a temperature between about 50° and 200° C. in the presence of a nickel-containing catalyst prepared by the treatment of a nickel-aluminum alloy with an aqueous alkali, a solution of an aldehyde selected from the group consisting of alkyl, alkoxy, aryl, alkyl aryl, hydroxy aryl, alkoxy aryl, halogen aryl and furfuryl aldehydes, the alpha carbon atom of which is attached only to carbon atoms, and less than $2/3$ mol of ammonia to each mol of aldehyde present and distilling directly from the hydrogenated solution a predominant proportion of secondary amine.

8. In a method of preparing dibenzyl amine, the steps which comprise hydrogenating benzaldehyde under a pressure greater than 20 atmospheres and at a temperature between about 50° and 200° C. in the presence of a hydrogenation catalyst and a deficiency of ammonia with respect to that necessary to form the hydro-amide of said aldehyde and distilling directly from the hydrogenated mass a predominant proportion of dibenzyl amine.

9. In a method of preparing difurfuryl amine, the steps which comprise hydrogenating furfural and less than $2/3$ mol of ammonia per mol of furfural under a pressure greater than 20 atmospheres and at a temperature between about 50° and 200° C. in the presence of a hydrogenation catalyst and recovering from the hydrogenated mass without further chemical treatment a predominant proportion of difurfuryl amine.

CHARLES F. WINANS.